(12) United States Patent
Hagen

(10) Patent No.: US 9,491,896 B1
(45) Date of Patent: Nov. 15, 2016

(54) DUAL HANDLE SHOVEL

(71) Applicant: Adam J. Hagen, Panama City Beach, FL (US)

(72) Inventor: Adam J. Hagen, Panama City Beach, FL (US)

(*) Notice: Subject to any disclaimer, the term of this patent is extended or adjusted under 35 U.S.C. 154(b) by 0 days.

(21) Appl. No.: 15/001,647

(22) Filed: Jan. 20, 2016

(51) Int. Cl.
*A01B 1/00* (2006.01)
*A01B 1/02* (2006.01)

(52) U.S. Cl.
CPC ..................... *A01B 1/026* (2013.01)

(58) Field of Classification Search
CPC .......... A01B 1/026; B25G 1/00; B25F 5/026
USPC ...................... 294/49–181; 16/426
See application file for complete search history.

(56) References Cited

U.S. PATENT DOCUMENTS

| 1,453,188 | A | * | 4/1923 | Ruppe | B25G 3/02 294/58 |
| 4,050,728 | A | * | 9/1977 | Davidson | A01B 1/026 16/426 |
| 5,133,582 | A | | 7/1992 | Rocha | |
| 5,496,085 | A | * | 3/1996 | Middleton | A01B 1/026 16/426 |
| 5,704,672 | A | | 1/1998 | Sims | |
| 5,921,600 | A | * | 7/1999 | Lucas | A01B 1/026 294/58 |
| D441,623 | S | | 5/2001 | Storlie | |
| 6,283,522 | B1 | * | 9/2001 | Renaud | B25G 1/00 294/58 |
| 9,212,461 | B2 | | 12/2015 | Putre | |
| 2005/0242598 | A1 | * | 11/2005 | Pin | A01B 1/026 294/58 |
| 2007/0145757 | A1 | * | 6/2007 | Wu | A01B 1/026 294/58 |
| 2008/0196205 | A1 | * | 8/2008 | Hixon | A01B 1/026 16/426 |
| 2011/0173778 | A1 | * | 7/2011 | Wales | B25G 3/20 16/426 |

* cited by examiner

*Primary Examiner* — Gabriela Puig
(74) *Attorney, Agent, or Firm* — Lawrence J. Gibney; Mitchell R. Ghanele

(57) ABSTRACT

An improved shovel with two handles for reducing the strain on a user's lower back. This two handled shovel provides a shovel with an extension arm that may rotate along the pole of the shovel and may lay flush against the pole in a locked position when not in use. The extension arm provides the additional handle, which may also rotate.

17 Claims, 3 Drawing Sheets

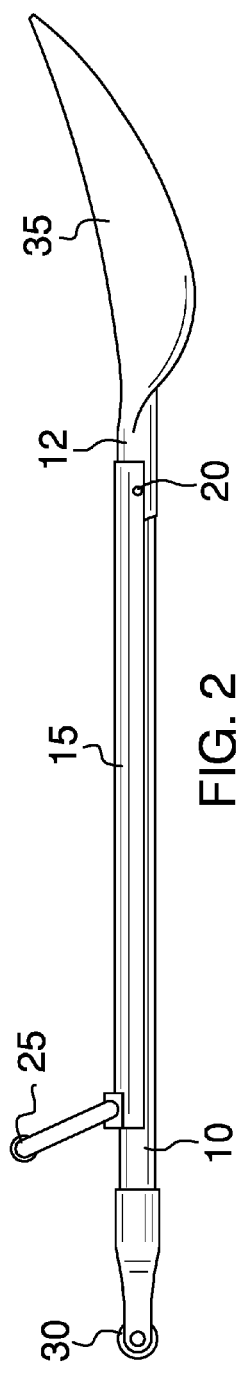
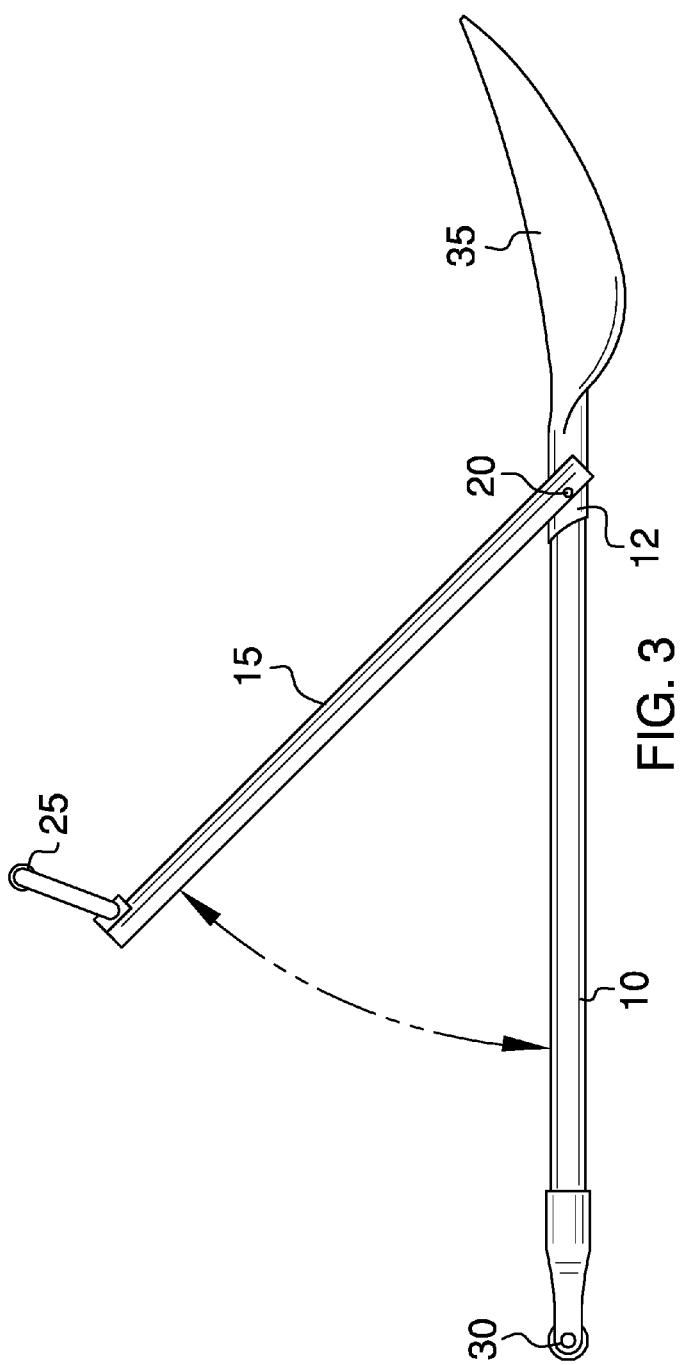

DUAL HANDLE SHOVEL

This application claims the benefit of the filing date under 35 U.S.C. §119(e) of Provisional U.S. Patent Application 62/125,379 filed on Jan. 20, 2015.

BACKGROUND OF THE INVENTION

A. Field of the Invention

This invention relates to using a shovel with two handles and an extension arm to lift and move dirt, snow, or other materials to prevent pressure on one's back during the lift.

B. Prior Art

The modern day shovel that provides one handle, a pole, and a shovel blade has been used by homeowners and construction workers for quite some time. The present invention utilizes a second handle to help increase efficiency of the shovel when in use and prevent back injury. There are prior art references that disclose shovels with two handles and can be found at Rocha, U.S. Pat. No. 5,133,582; Sims, U.S. Pat. No. 5,704,672; and Storlie, U.S. Pat. No. D441,623.

Each of the prior art references are significantly different from the present invention. The Rocha '582 reference teaches a two handled shovel with a pole for each handle. Each handle is attached to a separate pole. The secondary handle is attached to a shortened pole relative to the primary shovel pole. The shortened pole is then connected at a point near the blade of the shovel and may rotate on one axis.

The Sims '672 reference discloses a snow shovel with an auxiliary handle. The auxiliary handle is tethered to the shovel with a flexible material such as a cord.

The Storlie '623 reference is a dual handle shovel that depicts a second handle and second pole attaching to the interior of the blade of the shovel.

BRIEF SUMMARY OF THE INVENTION

A typical shovel provides a handle, a blade, and a pole that attaches the handle to the blade. When digging or moving material, a user will often place one hand on the handle and a second hand on the pole. The second hand is usually placed near the connection where the pole meets the blade. The closer the second hand is to the blade of the shovel the more material a user or worker can usually lift, and thus, the faster a worker can dig. However, the further down a worker places her or his second hand, the lower she or he must bend over. Although the user's second hand assists in preventing some strain on the user's back, the user will still have significant pressure on her or his lower back area. Accordingly, workers often strain their lower back when working with a traditional shovel for an extended period of time.

The present invention provides an additional handle that is attached to a half round pipe known as the extension arm. The extension arm is attached to the pole of the shovel near the location where the blade of the shovel attaches to the pole. When the extension arm is not in use, it can lay in a closed position which is flush against the shovel pole, thereby reducing the device's profile. Accordingly, when the extension arm is in the closed position, it allows the user to use the shovel as a normal shovel without having to disconnect the extension arm. This provides the user a unique and novel versatility that none of the prior art can provide.

BRIEF DESCRIPTION OF THE DRAWINGS

FIG. 2 is a side view of the device, which depicts the extension arm laying over the pole of the shovel in a closed position.

FIG. 3 is a side view of the device, which depicts the extension arm in an open position.

NUMBERING REFERENCE

5—Device
10—Pole
12—Blade sleeve
15—Extension arm
20—Pivot pin
25—Extension handle
30—Shovel handle
35—Shovel blade

DETAILED DESCRIPTION OF THE EMBODIMENTS

Figure 1:
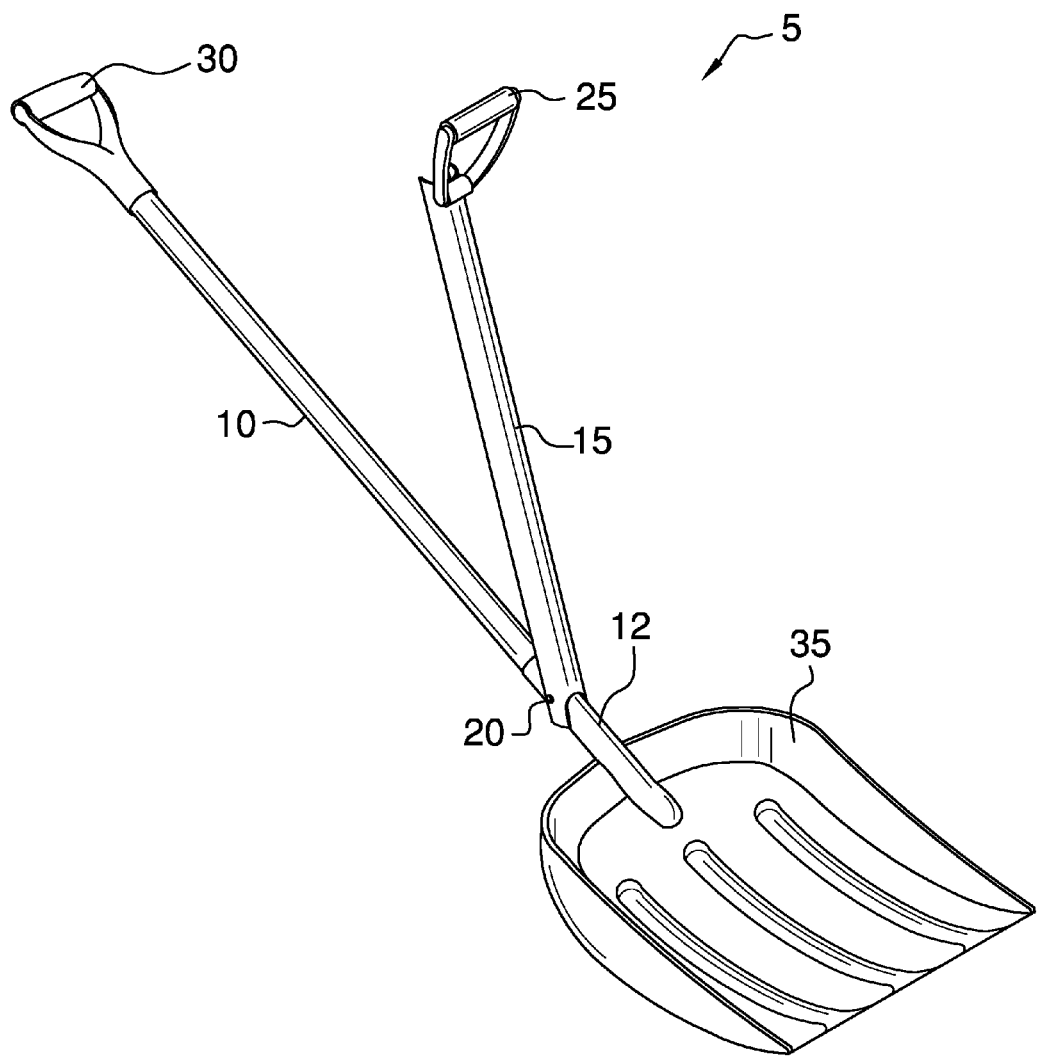
FIG. 1 is an isometric view of the device, which depicts the extension arm in an open position.
Figure 4:
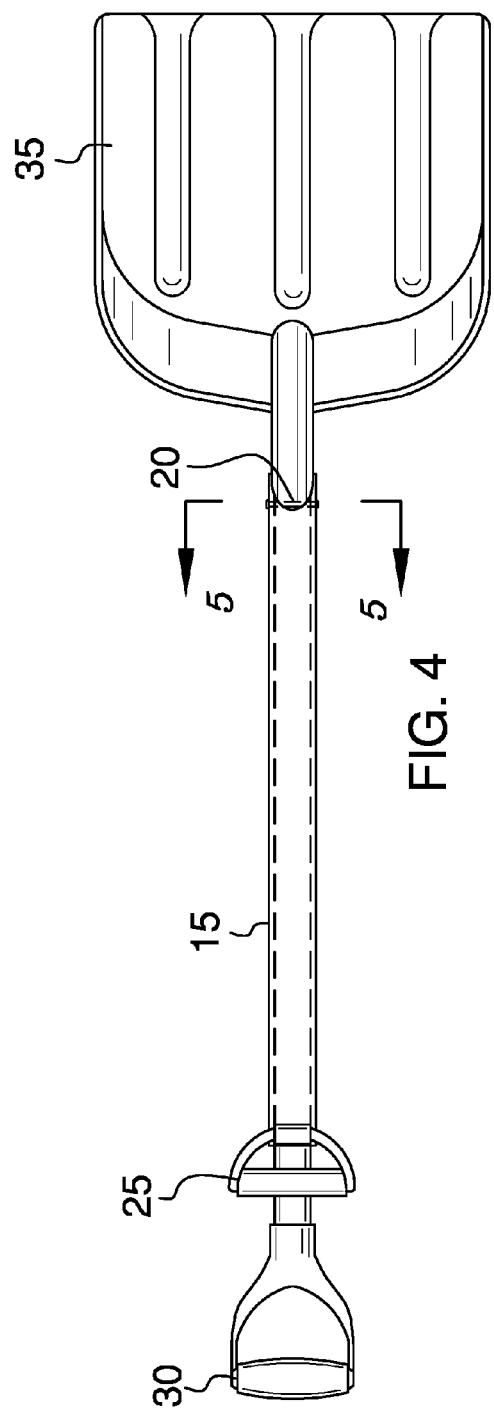
FIG. 4 is a top view of the device.

The claimed device 5 is comprised of a pole 10, a blade sleeve 12, an extension arm 15, a pivot pin 20, an extension handle 25, a shovel handle 30, and a shovel blade 35. The shovel handle 30 is at the first end of pole 10 and the shovel blade 35 is placed at the second end of the pole 10 as depicted in FIG. 1.

The blade sleeve 12 wraps around the pole 10 to increase the strength and integrity of the shovel.

The extension arm 15 is a half round pipe that provides a first end and a second end. The first end of the extension arm 15 is affixed to an extension handle 25. The extension handle 25 can rotate. The second end of the extension arm 15 is connected with a pivot pin 20 to the blade sleeve 12 and pole 10. However, a clamp or other mechanism can alternatively be used to connect the extension arm 15 to the blade sleeve 12 and pole 10. It is additionally anticipated that the extension arm 15 could be affixed to only the pole 10. The second end of the extension arm 15 provides a cut-out to allow for rotation between a closed position, as depicted in FIG. 2, and an open position, as depicted in FIG. 3. The pivot pin 20 also allows free rotation of the extension arm 15 while the user is holding the shovel handle 30 and the extension handle 25.

Figure 5:
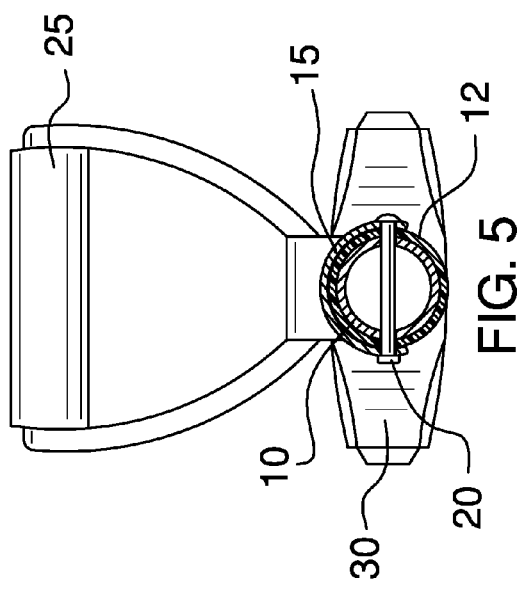
FIG. 5 is a cross-sectional view of the device, which shows the extension arm laying over the blade sleeve of the shovel in a closed position.

When the extension arm 15 is in a closed position it lays flush against the pole 10 as shown in FIG. 5. It is further anticipated that the extension arm 15 can lock against the pole 10 when in a closed position. The extension arm 15 can be locked to the pole 10 with cords, a hook and loop assembly, or simply clamp around the pole 10.

The shape of the half round pipe extension arm 15 is critical to allow versatility of use. For example, in constricted spaces the user may find it more useful to have the extension arm 15 in a closed locked position. However, in unrestricted spaces the user may open the extension arm and use it to decrease strain on the user's back. In other words, one may still wrap her or his second hand around the pole 10 and the extension arm 15 when the device 5 is in the closed position. Therefore, this device will provide the benefits of having an extension arm while still maintaining the option of using the device as a traditional shovel when necessary or desired by the user.

It is anticipated that the pole 10 can provide additional or alternative areas for the extension arm 15 to attach to. For example, the pole 10 and blade sleeve 12 may provide a plurality of through-holes for the extension arm 15 to attach to. This would benefit individuals of various heights. It is further anticipated that the extension arm may telescope for additional versatility in different working conditions for different individuals. In other words, the plurality of through-holes and telescoping extension arm 15 will allow workers to customize the device to fit their individual needs.

While the embodiments of the invention have been disclosed, certain modifications may be made by those skilled in the art to modify the invention without departing from the spirit of the invention.

The inventor claims:

1. A device which is comprised of:
   a. a pole;
      wherein the pole has a predetermined size;
      wherein the pole has a first end and a second end;
   b. a shovel blade;
      wherein the shovel blade has a predetermined size;
      wherein the shovel blade provides a blade sleeve;
      wherein the blade sleeve wraps around the second end of the pole;
      wherein the blade sleeve is attached to the second end of the pole;
   c. an extension arm;
      wherein the extension arm has a first end and a second end;
      wherein the extension arm is a half round pipe;
      wherein the extension arm directly attaches to both the pole and the blade sleeve;
      wherein the extension arm has a predetermined size;
   d. a shovel handle;
      wherein the shovel handle is attached to the first end of the pole;
   e. an extension handle;
      wherein the extension handle is attached to the first end of the extension arm.

2. The device as described in claim 1 wherein the second end of the extension arm has a cut-out.

3. The device described in claim 1 wherein the extension arm is able to rotate.

4. The device described in claim 1 wherein the extension arm is detachable.

5. The device described in claim 1 wherein the extension arm locks against the pole when in a closed position.

6. The device described in claim 1 wherein the extension arm may telescope.

7. The device described in claim 1 wherein the extension handle is able to rotate.

8. A device which is comprised of:
   a. a pole;
      wherein the pole has a predetermined size and a cut-out on the second end;
      wherein the pole has a first end and a second end;
      wherein the pole has at least one through-hole;
   b. a shovel blade;
      wherein the blade has a predetermined size;
      wherein the blade provides a blade sleeve;
      wherein the blade sleeve wraps around the second end of the pole;
      wherein the blade sleeve is attached to the second end of the pole;
      wherein the blade sleeve has at least one-through hole;
   c. an extension arm;
      wherein the extension arm is a half round pipe;
      wherein the extension arm has a first end and a second end;
      wherein the extension arm has a predetermined size;
      wherein the extension arm has at least one through-hole;
   d. a shovel handle;
      wherein the shovel handle is attached to the first end of the pole;
   e. an extension handle;
      wherein the extension handle is attached to the first end of the extension arm.

9. The device described in claim 8 wherein the extension arm attaches to the blade sleeve.

10. The device described in claim 8 wherein the extension arm attaches to the pole.

11. The device described in claim 8 wherein the extension arm attaches to the blade sleeve and to the pole.

12. The device described in claim 8 wherein the extension arm is able to rotate.

13. The device described in claim 8 wherein the extension arm is detachable.

14. The device described in claim 8 wherein the extension arm is adjustable.

15. The device described in claim 8 wherein the extension arm locks against the pole when in a closed position.

16. The device described in 8 wherein the extension arm may telescope.

17. The device described in claim 8 wherein the extension handle rotates.

* * * * *